March 27, 1934.     J. SORENSEN     1,953,057
BRAKE SYSTEM FOR AUTOMOTIVE VEHICLES
Filed May 22, 1931     3 Sheets-Sheet 1
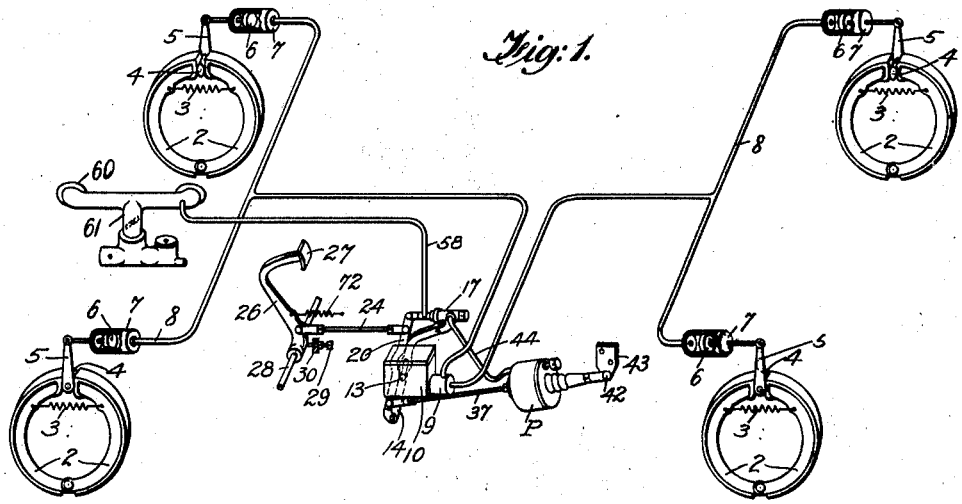
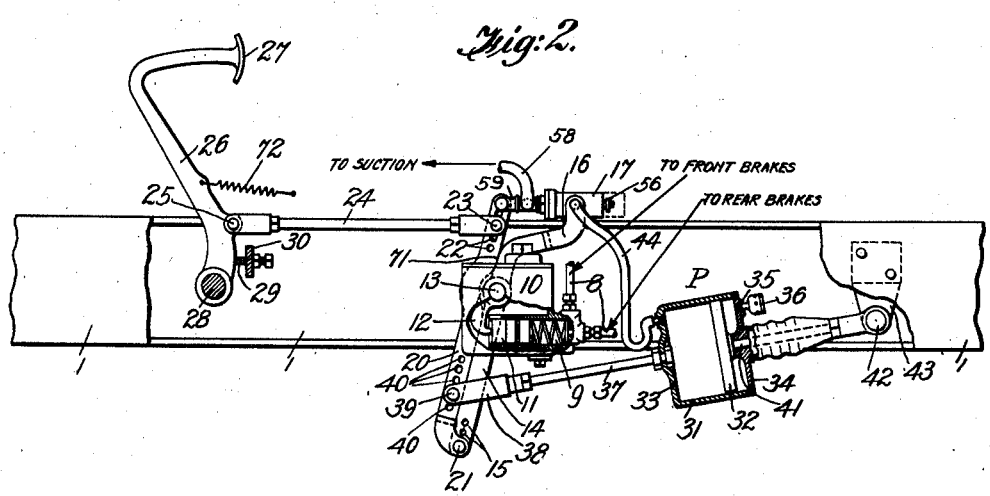
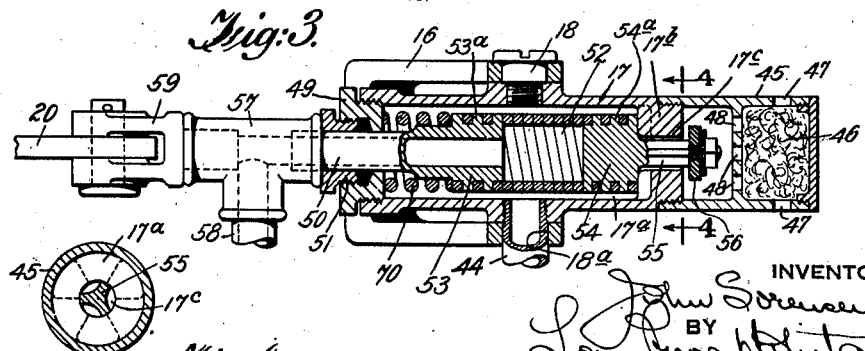
INVENTOR
John Sorensen
BY
Louis Prevost Whitaker
ATTORNEY March 27, 1934. J. SORENSEN 1,953,057
BRAKE SYSTEM FOR AUTOMOTIVE VEHICLES
Filed May 22, 1931 3 Sheets-Sheet 2
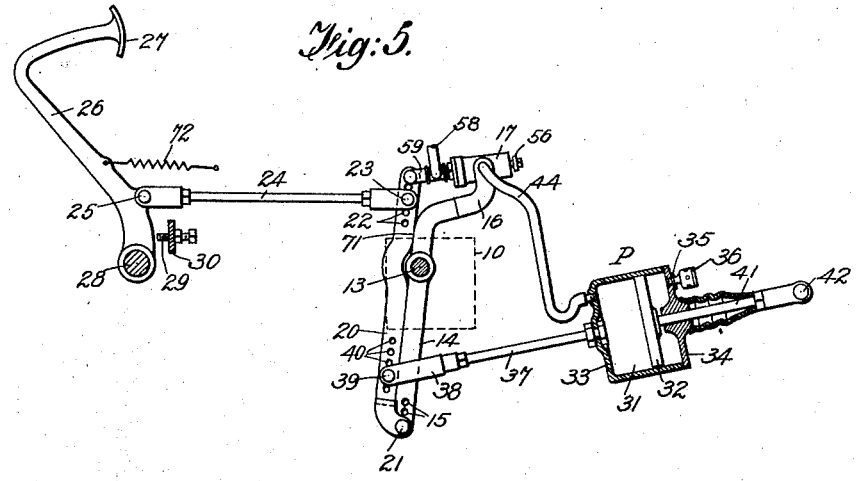
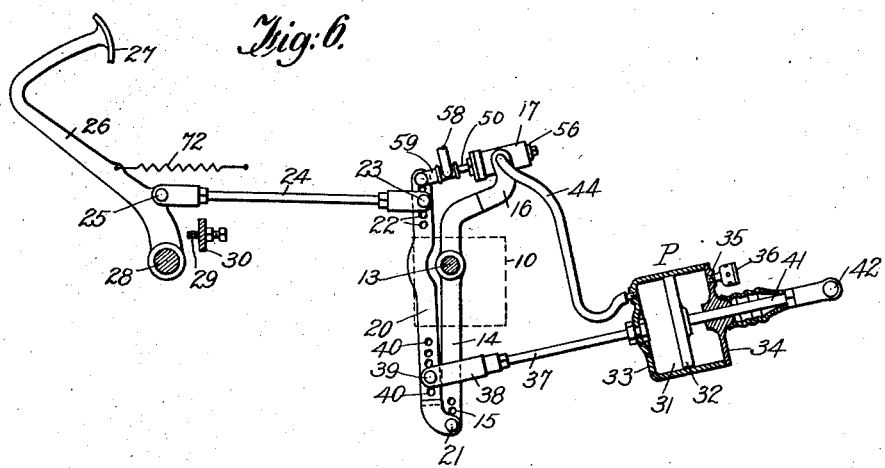
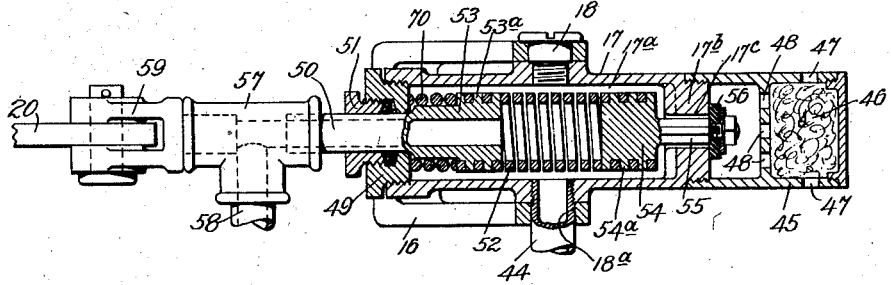
INVENTOR
John Sorensen
BY
Louis Prevost Whitaker
ATTORNEY March 27, 1934.  J. SORENSEN  1,953,057
BRAKE SYSTEM FOR AUTOMOTIVE VEHICLES
Filed May 22, 1931   3 Sheets-Sheet 3
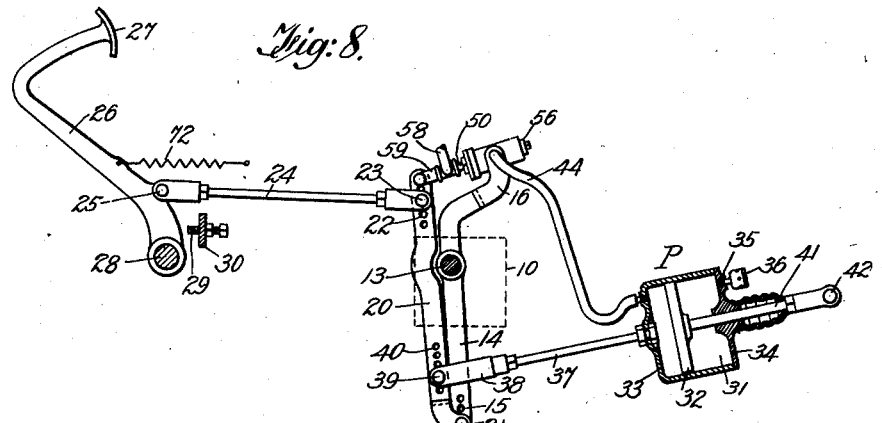

Patented Mar. 27, 1934

1,953,057

UNITED STATES PATENT OFFICE 1,953,057

BRAKE SYSTEM FOR AUTOMOTIVE VEHICLES

John Sorensen, Weehawken, N. J.

Application May 22, 1931, Serial No. 539,195

16 Claims. (Cl. 188—152)

My invention consists in the novel features hereinafter described, reference being had to the accompanying drawings which show one embodiment of my invention, and slight modifications thereof, selected by me for purposes of illustration, and the said invention is fully disclosed in the following description and claims.

My invention comprises a brake system in which the brakes may be applied by power, as by a fluid pressure actuator or servo motor (preferably by atmospheric pressure working against a vacuum obtained by a connection with the intake manifold of the internal combustion engine which propels the vehicle) or by physical force, or both, under the control of a physically operated part usually the ordinary brake pedal. My invention consists essentially in the provision of a pair of levers, termed respectively the power applying lever, and the physically operable lever, pivotally connected with each other and capable of a limited relative movement, the power applying lever being pivotally supported for joint oscillation, preferably by being rigidly connected with a rock shaft, which is operatively connected with the brakes, by hydraulic or mechanical means. The said physically operable lever is connected above the rock shaft with the usual pedal or pedal lever, or other part directly engaged by the foot or hand of the operator in such manner that physical force will be applied in a direction tending to separate said levers, while the power actuator is directly connected with the physically operable lever below the rock shaft and at a point between the pivotal connection of said levers and the point where physical force is applied to the physically operable lever, the power actuator acting in a direction tending to bring said levers together, and being connected to the power actuating lever and the brakes through its pivotal connection with the physically operable lever. Controlling means, as controlling valve mechanism is connected with said levers so as to be operated by the relative movement of the levers, to apply the brakes, hold them as applied, or release them under the control of the operator, the construction being such as to permit the levers to turn together upon the pivotal support of the power applying lever by physical force alone, to bring the friction surfaces of the brake mechanisms into firm contact before the valve mechanism operates to apply the power of the actuator to the brakes. When the power of the actuator is brought into operation, it is distributed by the physically operable lever between the power applying lever, acting in a direction to apply the brakes, and the part engaged by the operator, upon which it acts in a direction to resist the physical force applied thereto, so that the operator will feel variations in the force exerted by the actuator as the difference of fluid pressures therein increases or diminishes under the control of the valve mechanism. When the brakes have been applied, with less than the full power of the actuator, if the operator stops the forward movement of his foot, the actuator will continue to exert its power on said levers in a direction to bring them together, and will automatically bring the valve mechanism into position to prevent the further application of the brakes, thus providing the "follow-up" operation. The force exerted by the operator to resist or overcome the portion of the power transmitted to his foot (or hand) from the actuator, will obviously be exerted in a direction to apply the brakes, and by taking up the lost motion between said levers, the force of the operator may be applied to the power operating lever and its brakes in addition to the power of the actuator or to apply the brakes by physical force alone in case of failure of power.

In carrying out my invention, I prefer to employ a special form of valve mechanism in which the valve means for controlling the suction connection consists of a plurality of spiral coils normally held yieldingly in close contact so as to seal said connection, but being capable of slight separation to open said connection. Obviously a very small movement of the valve operated means, sufficient to effect an exceedingly minute separation of the spiral coils, will produce a spiral aperture extending between all of the separated coils, and having a large area compared with the small diameter of the coils and the minute separation thereof. Satisfactory results may be had with a section of closely coiled round spring wire, but I prefer to form the coils of spring rod or wire of square or other polygonal cross section having the coils thereof provided with plane faces, closely engaging each other, in practically air-tight contact. The resiliency of the spring coils also normally holds the said valve means in closed position. I have shown this form of valve means for controlling the suction connection, but it will be obvious that it could likewise be employed to control the high pressure or atmospheric connection for the actuator if found desirable. This form of valve mechanism is extremely cheap and efficient and its use in the brake system described is particularly advantageous, the retracting influence of its coils being applied to said levers in a direction to bring them together and close the suction connection to hold the brakes as applied.

In the drawings forming part of this application,

Fig. 1 is a diagrammatic view of a four-wheel hydraulic brake system for automotive vehicles showing my invention embodied therein, the power applying lever being secured to and pivotally supported by a rock shaft operatively connected with the piston of the master pressure cylinder of the hydraulic system.

Fig. 2 is an enlarged side elevation of a portion of the apparatus shown in Fig. 1, including the pedal lever, power actuator, and parts connected therewith.

Fig. 3 is an enlarged horizontal sectional view, partly in elevation, illustrating the controlling valve mechanism for the actuator shown in Figs. 1 and 2.

Fig. 4 is a detail sectional view on line 4—4 of Fig. 3.

Fig. 5 is a view similar to Fig. 2, showing the levers moved simultaneously by physical force to bring the friction surfaces of the brakes into contact.

Fig. 6 is a view similar to Fig. 2, showing the position of the parts illustrated therein after the pedal has been depressed sufficiently to close the air inlet valve and open the suction valve by applying power to the brakes.

Fig. 7 is a plan view of the valve mechanism, partly broken away, to illustrate the position of the valve means when the parts are in the position shown in Fig. 6.

Fig. 8 is a view similar to Fig. 6, showing the follow-up action of the power actuator when the movement of the pedal is stopped.

Fig. 9 is a view of the valve mechanism, similar to Fig. 7, showing the positions of the means which they would occupy when the parts are in the position shown in Fig. 8.

Fig. 10 is a perspective view illustrating the application of my invention to a brake system in which the rock shaft is connected to the several brakes by mechanical means.

Fig. 11 is a detail sectional view showing a slightly different form of valve mechanism.

Referring to the drawings, I have illustrated diagrammatically in Fig. 1, a four wheel brake system for an automotive vehicle in which figure, 1, represents portions of the chassis, 2, the brake shoes of internally expanding brake mechanisms for each of the four wheels of the vehicle (not shown), which may be of any usual or desired form, but in this instance are shown for purposes of illustration as provided with the retracting spring 3, expanding cam, 4, and cam operating levers, 5. Each of the cam operating levers, 5, is connected with a small piston, 6, in a hydraulic cylinder, 7, and the individual brake cylinders are connected by the usual pipes, indicated at 8, with a master hydraulic pressure cylinder, 9, forming part of a master pressure cylinder unit, 10, and provided with a piston, 11, operated by an arm, 12, on a rock shaft, 13, as best indicated in Fig. 2. These parts are of well known construction and form no part of my invention. The master cylinder unit, 10, is permanently secured to the chassis, 1, in any usual or desired manner.

14 represents the power applying lever, which is rigidly secured to the rock shaft, 13, which forms a pivotal support therefor. This lever, 14, has a portion extending below the rock shaft, and is provided at its lower end with a series of pivot apertures, 15. The power applying lever also preferably has a portion extending above the rock shaft, which in this instance is provided with a yoke, 16, to which the valve casing, 17, is pivotally connected, preferably by trunnions, 18 and 18a, projecting laterally on opposite sides thereof. 20 represents the physically operable lever, the lower end of which is pivotally connected to the lower end of the power applying lever, 14, by a pivot pin, 21, engaging one of the pivot apertures, 15, which permits an adjustment to vary the leverage at which power is applied to the power applying lever. The lever, 20, occupies a position substantially parallel to the lever, 14, and has a limited movement with respect thereto, controlled by suitable stop means, hereinafter described, while the two levers, 20 and 14, are capable of oscillating together upon the axis of the rock shaft, constituting the pivotal support for the power applying lever. The physically operable lever extends upward past the rock shaft, 13, and is provided adjacent to its upper end with a plurality of pivot apertures, 22, to receive a pivot pin, 23, for connecting one end of a drag bar or link, 24, thereto. The other end of the link or drag bar, 24, is pivotally connected, at 25, to a pedal lever, 26, provided with a pedal, 27, and pivotally mounted at 28, in the chassis in any usual or preferred manner. A suitable stop may be provided for limiting the return movement of the pedal lever, and in this instance I have shown an adjustable stop screw, 29, engaging a part, 30, secured to the chassis for this purpose.

P represents a power actuator operated by differentials of fluid pressures, and comprising in this instance a cylinder, 31, and piston, 32. The cylinder is shown closed at both ends by heads, 33 and 34, the head, 34, which is in rear of the piston being provided with an aperture, 35, at all times in communication with the atmosphere and conveniently provided with the usual dust box, 36. In this instance the cylinder head, 33, is rigidly connected to a rod or link, 37, the forward end of which is provided with a yoke, 38, passing around the power applying lever, 14, and pivotally connected to the physically operable lever, 20, by a pivot pin, 39, engaging one of a plurality of pivot apertures, 40, provided in the lever, 20, adjacent to its lower end. The pivotal connection between the rod or link, 37, and the physically operable lever, 20, is located between the point of connection (21) with the power applying lever and the point of connection (23) with the pedal lever, and is also located in a plane between the point of connection (21) and the rock shaft, 13, as will be readily seen from the drawings. The point, 23, at which the pedal is connected with the physically operable lever, is in a plane on the opposite side of the rock shaft, 13, from the pivotal connection, 39. The piston, 32, of the actuator, is in this instance provided with a piston rod, 41, extending through the head, 34, and having its outer end pivotally connected at 42, with bracket, 43, secured to the chassis. In this position of the parts, the piston will be held stationary and the cylinder will move with respect to the piston, but obviously the positions of the movable parts of the actuator could be reversed, if desired. The power actuator is supported in this instance entirely by the pivot connections at the outer ends of the rod, 37, with the physically operable lever, and the connection of the piston rod, with the bracket, 43, and the movable element of the power actuator. In this instance the cylinder, is connected with the power applying lever, 14, through the connection of the rod, 37, with the physically operable lever, at 39, and the connection of the physically operable lever with the power applying lever, at 21.

The controlling valve mechanism for the power actuator is preferably carried by one of the levers, 14, 20, which are operatively connected therewith, so that the valve will be operated by the relative movement of said levers, as hereinafter described.

As shown in the drawings the valve casing, 17, is of cylindrical form and is provided on opposite sides with trunnions, 18 and 18a, for pivotally connecting it with the yoke, 16, formed on or conducted with the upper end of the power applying lever, 14. The trunnion, 18, may be formed by a screw, as shown, and the trunnion, 18a, is formed by a tube communicating with a chamber, 17a, in the valve casing, and connected by a flexible pipe, 44, with the closed end of the actuator or cylinder forward of the piston. The valve chamber, 17a, is provided at one end with a wall, 17b, provided with an inlet aperture, 17c, and having an exterior threaded portion to receive a cylindrical extension, 45, the interior of which communicates with the atmosphere (or other source of higher fluid pressure) in this instance through a dust strainer, 46, provided with apertures, 47 and 48. The opposite end of the valve chamber, 17a, is internally threaded to receive a closing plug, 49, having an aperture therein for the passage of the hollow valve stem or sleeve, 50, and also provided with a stuffing box, 51, or other sealing means therefor.

The suction valve consists in this instance of a coil of spring metal, indicated at 52, the coils of which are normally held in substantially air tight connection with each other by the inherent resilience of the spring material. I have obtained very satisfactory results with spring coils of metal of circular cross section, but I prefer to use a metal wire or rod of square or other polygonal form so that the meeting portions of the coils will be plane faces. One end of the spring coil, 52, is rigidly and sealingly secured to a boss, 53, surrounding the inner end of the sleeve, 50, by soldering, brazing, or otherwise, and the other end of the coil is similarly secured to a boss, 54, having an auxiliary valve stem, 55, extending through and guided in the air inlet aperture, 17c, and carrying at its outer end an air inlet valve, which in this instance comprises a compressible disc or washer, 56, on a reduced threaded extension of the stem, 55, and held in place by a nut and washer, or in any other preferred way. The bosses, 53 and 54, may be conveniently provided with threaded portions, 53a and 54a, to engage the end coils of the spring valve, 52, which end coils may be sufficiently expanded to engage said threaded portions, as shown in the drawings, but this is not essential. The auxiliary valve stem is of sufficient length to hold the air inlet valve in open position, in the normal position of the parts (see Fig. 3) and said stem and the aperture, 17c, are suitably constructed to place the valve chamber, 17a, in communication with the atmosphere, in such position. As shown, the stem is made triangular in cross section and the aperture, 17c, is circular, as shown in Fig. 4. When the air inlet valve is open, the actuator cylinder forward of the piston will be directly connected with the atmosphere through pipe, 44, and the piston therein will be pressure balanced.

The outer portion of the hollow stem, 50, is provided with a branch pipe connection, 57, which is connected by a pipe, 58, a portion of which is flexible, with the source of lower fluid pressure, in this instance being connected with the intake manifold, 61, of the internal combustion engine, 60, for propelling the vehicle, the connection being made between the throttle valve and the engine cylinders in the usual manner. The outer end of sleeve, 50, is provided with a yoke, 59, which is pivotally connected with the upper end of the physically operable lever, 20, so that any separation of the levers will move the valve stem in a direction to first close the inlet valve and thereafter separate the coils of the spring, 52, to connect the valve chamber, 17a, and the actuator cylinder with the manifold, or other suction source.

I provide yielding means for holding the levers, 14 and 20, against separating, so that they will move simultaneously during the first portion of the pedal stroke, to apply the brakes, at least far enough to bring the friction surfaces of the brake mechanisms into firm engagement without operating the valve mechanism or initiating the operation of the power actuator. I prefer to employ for this purpose a coiled spring, 70, interposed between a portion of the boss, 53, on the hollow valve stem, 50, and the closing plug, 49, of the valve casing. This spring is made somewhat stronger than the ordinary retracting springs of the brake mechanism so that it will not begin to yield until the levers, 14 and 20, have been moved by the operator far enough to apply the brake shoes (or brake band). The spring for the purpose named may be otherwise connected to the lever, 20, if desired, so as to prevent the separation of the levers until the friction surfaces of the brakes are in engagement.

I also provide stop means for limiting the relative movement of the levers, 14 and 20, in both directions, which may be of any desired form. In the drawings I have shown the levers, 14 and 20, arranged in the same vertical longitudinal plane and having their adjacent edges in contact, as indicated at 71 in Fig. 2, to constitute the stop means for limiting the movements of said levers toward each other, and in this instance I have shown the spring, 70, so constructed that its coils will come together and form a stop to limit the movement of said levers away from each other. In the latter position of the parts it is obvious that the lost motion between said levers, 14 and 20, would be taken up and the physical force of the operator will be exerted from the pedal directly through said levers to the brakes, to supplement the force exerted by the actuator or to apply the brakes by physical force alone. I do not, however, limit myself to the particular forms of stop means shown. The pedal may also be provided with a retraction spring, as indicated at 72, which need not have any greater strength than is necessary to substantially balance the weight of the pedal and hold it in its retracted position.

The operation of the apparatus is as follows. The released position of the brake mechanism is illustrated in Figs. 1 and 2. Assuming that the engine is running, with the throttle valve closed or partly closed, a partial vacuum will exist in the intake manifold of the engine, sufficient to produce a pressure differential from atmospheric pressure represented by approximately twenty inches of mercury, at maximum, which will enable the actuator to operate with a maximum of fluid pressure on the piston of approximately ten pounds per square inch. When the operator desires to apply the brakes he will apply his foot to the pedal and depress it, thereby applying a certain amount of physical force to the upper end of the physically operable lever, 20. This force will be transmitted through the valve stem, 50, the coil spring, 70, and the valve casing, 17, to the upper end of the power applying lever, 14, thus causing both levers to turn together into the position indicated in Fig. 5, without separating, and operating the rock shaft, 13, so as to bring the friction surfaces of the several brake mechanisms into contact, and without operating the valve mechanism for the actuator. The movable element of the actuator, which is connected to the physically operable lever, 20, adjacent to its lower end, will be moved in a direction to advance the piston in the cylinder, and as the air inlet valve, 56, is still open, a certain amount of air will be expelled from the actuator cylinder, so that the actuator offers no resistance to this portion of the movement of the levers, 14 and 20, beyond the friction of the piston in the cylinder, and as before stated, the spring, 70, is strong enough to overcome the resistance of the retracting springs for the brake mechanisms.

As soon as the friction surfaces of the brake mechanisms are engaged, they will offer sufficient resistance to the further rotation of the rock shaft, 13, to overcome the force exerted by the spring, 70, so that the further depression of the pedal will cause the spring, 70, to yield, and the physically operable lever, 20, will move forward with respect to the power applying lever, 14, on the pivot connecting said lever. This first closes the air inlet valve, 56, and then separates the coils of the suction valve, 52, and brings the parts into the positions indicated in Figs. 6 and 7.

As will be seen from an examination of Fig. 7, in which the separation of the coils of the spring suction valve, 52, is exaggerated, each of these coils will be separated from the adjacent coils. In practice, an extremely minute separation of these coils, even in a spring valve of as small a diameter as a half inch, is sufficient to place the actuator cylinder forward of the piston in full communication with the intake manifold, 61. Obviously, there will exist a substantially annular passage between each coil and the next adjacent coil, and as the sum total of the area of these annular passages need only equal the cross sectional area of the aperture in the hollow valve stem, 50, it is obvious that an extremely slight movement of the valve stem with respect to the valve casing is all that is required to open or close the suction valve. As soon as the suction valve is open, the air in the actuator cylinder forward of the piston will be exhausted and atmospheric pressure acting in this instance on the forward head of the actuator cylinder will move the cylinder toward the right in Fig. 6, thus applying the power of the actuator to the physically operable lever, 20, and distributing this force between the brake mechanisms and the foot of the operator in a proportion depending upon the relation of the point of pivoting, 39, of the yoke, 38, with respect to the pivot pin, 21, and the pivot pin, 23. The proportions shown in the drawings are approximately one to three, so that in the construction shown, approximately three quarters of the power of the actuator will be applied to the brake mechanism through the power actuating lever, 14, and approximately one quarter will be applied to the foot of the operator to resist his physical effort in depressing the pedal, and as the differential of fluid pressures on the actuator cylinder increases by the continued evacuation of the cylinder, the gradually increasing force exerted by the actuator will continue to be distributed in these proportions. Obviously the proportions can be varied by adjusting the pivot pin, 19, from one to another of the pivot apertures, 40, in the lever, 20, and also by adjusting the pin, 23, by means of the pivotal apertures, 22, if they are provided, so that any desired reaction against the foot of the operator can be provided.

The force of the actuator is transmitted to the power applying lever, 14, through the lever, 20, and pivot pin, 21, and exerted upon the rock shaft, 13, at any desired leverage depending upon the pistons between the pivot pin, 21, and the rock shaft, which can be varied if desired by adjusting the pin, 21, from one to another of the pivotal apertures provided in the lower end of the lever, 14. The reaction against the foot of the operator, which will be in exact proportion to the amount of force exerted by the actuator upon the brake mechanism enables him to determine by the sense of feel the amount of force being applied by the actuator to the brake mechanism without having to overcome more than a fraction of that force. The position of the parts illustrated in Fig. 6 shows them at a time when the brakes have been partially applied, and it will be understood that as the differential of fluid pressures in the actuator increases, or builds up, the movement of the actuator cylinder will draw the lower ends of both levers, 20 and 14, toward the right in Fig. 6, the pedal being moved in the opposite direction and the operator being required to exert an increasing amount of pressure on the pedal in order to keep the air inlet valve, 56, closed, and the suction valve, 52, open.

If, before the maximum force has been exerted, the operator ceases to depress the pedal so that the forward movement thereof stops, the forward movement of the upper end of lever, 20, is arrested, and a minute further movement of the movable element of the power actuator, in this instance the cylinder, will move the lower end of the lever, 14, a little further to the right, thus moving the upper end of the yoke, 16, to the left in Fig. 6, toward the lever, 20, so as to permit the coils of the spring suction valve, 52, to close without opening the air inlet valve, 56, as shown in Figs. 8 and 9, and instantly arresting the parts to hold the brakes as applied. This action, by which the levers, 20 and 14, are moved toward each other by the power actuator, constitutes the "follow-up" action, which enables the operator to apply the brakes to a greater or less extent under as delicate a control by the power actuator as if he were applying the brakes entirely by physical force.

It will be seen that a suction valve in the form of a coil as illustrated at 52, is peculiarly adapted for use in a vacuum brake system of the kind shown, as the amount of relative movement between the levers, 20 and 14, required to separate the valve coils, or permit them to close, is so slight as to be microscopic, and therefore the operation of the actuator in applying power to the brakes and ceasing to apply increased power will follow practically instantaneously the operation of the pedal by the foot and the time lag which might otherwise occur when it is desired to hold the brakes as applied and which might otherwise result in the addition of a material amount of pressure during the closing movement of the suction valve, is almost entirely avoided.

Furthermore, the desired maximum opening to admit suction may be obtained with a coil valve of extremely small diameter, and with comparatively few separable coils, so that the controlling valve mechanism can be made very small and compact and at small expense, which is distinctly advantageous. While, as a matter of fact, I have found this valve thoroughly practical at pressures far above those possible in a vacuum brake apparatus in which the maximum differential of fluid pressures will not ordinarily exceed ten pounds per square inch, it is to be noted that the maximum vacuum which this valve has to withstand in the closed position is only obtained when the throttle valve is closed or nearly closed, at which time the power of the engine is not required for propulsion purposes, so that even if there were a very slight leakage between the coils of the valve, 52, it would not interfere with the engine, nor would it interfere with the braking operation, which only takes place with the valve in open position. When the throttle valve is open for fast running, and the engine is operating to propel the vehicle, there is little or no vacuum in the intake manifold, and at such times even if any air could pass the vacuum valve under such low vacuum, it would not in any way interfere with the operation of the engine. Further, when the suction valve is closed, the air inlet valve, 56, is always open, and pressures are balanced in the actuator cylinder so that under no circumstances could any leakage between the coils of the suction valve, even if such were to occur, have any effect on the control of the brake mechanisms. If it should be thought desirable, a simple means of obtaining substantially air tight relation of the valve coils in the closed position will be found, for example, in applying an enamel coating to the coils while in the separated relation, allowing the coils to close before the coating is dry, and then separating them and holding them at separated relation while the coating dries, but as before stated, no difficulty will be experienced in forming this valve coil so that the coils will engage each other in the closed position in substantially air tight manner.

It will be understood that when the brakes have been applied with the maximum power of the actuator, the operator, by still further depressing the pedal a very short distance, so as to bring into operation the stop which limits the extent of separation of the levers, 20 and 14, or in this instance brings the coils of the spring, 70, into engagement, the operator can apply physical force directly to the brakes through the yoke, 16, of the power applying lever, in addition to the power of the actuator, and in like manner can apply the brakes by physical force alone if the engine is not running, or in case of failure of power. During such further movement the valve stem, 50, will be moved very slightly, to the left from the position indicated in Fig. 7, which will be accommodated by the resilience of the air inlet valve, 56, or a spring may be interposed between the valve, 56, and the retaining nut, as in Fig. 11. It will also be understood that when it is desired to release the brakes after an application by power, the operator will simply remove his foot from the pedal, when the valve mechanism will return to the position shown in Fig. 3, the suction valve being first closed, and the air inlet valve thereafter opened to admit air to the cylinder forward of the piston to equalize pressures on the actuator and permit the brakes to release themselves under the action of their retracting spring.

While in Figs. 1 to 9 I have illustrated my invention as applied to a hydraulic brake installation, it is to be understood that it may likewise be applied to any brake system in which the brakes are applied by mechanical means. In Fig. 10, in which the parts corresponding with those shown in Figs 1 to 9 are given the same reference numerals with the addition of 100, I have illustrated diagrammatically a brake system embodying my invention, in which the brakes are applied by mechanical means. In this instance the rock shaft, indicated at 113, is an ordinary rock shaft, such as is used in mechanical brakes, and in this instance is provided at its opposite ends with the usual actuating arms, 112, extending in opposite directions therefrom, and connected by link rods, 108, with the appropriate cam actuating levers, 105, of the brake mechanisms for the front and rear wheels, which as shown, are of the same type illustrated in Fig. 1. The other parts of the apparatus are exactly the same as previously described and operate in exactly the same manner, and it will be unnecessary to repeat the portions of the specification describing the same.

It is also to be understood that my invention is not limited to the particular form of controlling valve mechanism heretofore described, although it is peculiarly adapted for this purpose. Other forms of valve mechanism may be employed, and in Fig. 11, in which the parts corresponding to those shown in Figs. 1 to 9 are given the same reference numerals with the addition of 200, I have illustrated a form of valve mechanism in which the suction valve is of the poppet type as well as the air inlet valve. The valve illustrated in Fig. 11, comprises the valve casing, 217, supported in the yoke, 216, in substantially the same manner as previously described. The interior of the valve casing provides the chamber, 217a, and a separate vacuum chamber, 217d, separated from the chamber, 217a, by a partition, 217e, having an opening therein, which is closed by the suction valve, 252, of poppet form, normally seated by a spring, 252a, interposed between the valve and a boss, 253, on the hollow valve stem, 250. The valve stem is provided with lateral apertures, 250a, which connect the interior of the stem with the vacuum chamber, 217d. The valve stem is also provided with an extension, 255, carrying the air inlet valve, 256, which in this instance is held against a shoulder on the stem by a light spring, 256a. The extension of the valve stem is also provided with a shoulder, 255a, at a slight distance from the suction valve in the released position of the parts, which is adapted to engage the suction valve to open it after the inlet valve, 256, has been closed. The other parts of the valve mechanism are substantially identical with those previously described, and the operation of the valve will be the same as hereinbefore recited. The valve shown in detail in Figures 3, 7 and 11 is also shown and is claimed in my copending application Serial No. 701,308.

The subject matter of certain of the claims herein, such as for example, 7, 8, 9, 10, 11, 12, 13, 14 and 16, is common to the present application and to applicant's prior application Serial No. 261,462, filed March 14, 1928, which became abandoned subsequently to the filing of the present application.

What I claim and desire to secure by Letters Patent is:

1. In a brake system for automotive vehicles, the combination with brake mechanism and power means therefor, of a power applying lever, a pivotal support therefor intermediate the ends thereof, a physically operable lever connected with said power applying lever independently of and at a distance from said pivotal support and at one of the ends of said power applying lever, said physically operable lever being adapted to be manually operated through a connection therewith on one side of said support, a link for connecting said power applying lever with said brake mechanism, means for directly connecting said power means with said physically operable lever at a point in a plane located between said pivotal support and the pivotal connections between said levers and on the other side of said support, and means operable by the relative movement of said levers for controlling said power means to apply and release the brakes, and hold the same as applied.

2. In a brake system for automotive vehicles, the combination with brake mechanism and power means therefor, of a power applying lever, a rock shaft rigidly connected to said lever and forming a pivotal support therefor, a physically operable lever pivotally connected with said power applying lever independently of and at a distance from said rock shaft, means for connecting said rock shaft with said brake mechanism, means for directly connecting said power means with said physically operated lever at a point in a plane located between said rock shaft and a pivotal connection between said levers, and fluid controlling valve means carried by and operable upon the relative movement of said levers for controlling said power means to apply and release the brakes, and to hold the same as applied.

3. In a brake system for automotive vehicles, the combination with brake mechanism and power means therefor, of a power applying lever, a rock shaft rigidly connected therewith and forming the pivotal support for said lever, a physically operable lever pivotally connected with said power applying lever independently of and at a distance from said rock shaft, said levers being capable of joint oscillation around the axis of said rock shaft and having a limited movement with respect to each other, connections from said rock shaft to said brake mechanism, means for directly connecting the power means with said physically operated lever at a point in a plane located between said rock shaft and the pivotal connections between said lever, and valve means carried by and operable by the relative movement of said levers for controlling said power means to apply and release the brakes, and to hold the same as applied.

4. In a brake system for automotive vehicles, the combination with brake mechanism and a fluid pressure power actuator therefor, of a power applying lever, an oscillating rock shaft rigidly connected therewith and forming a pivotal support therefor, a physically operable lever having one end pivotally connected to the power applying lever at a distance from said rock shaft, said levers being provided with interengaging stop means for limiting their relative movement with respect to each other, connections from said rock shaft to said brake mechanism, a connection from said power actuator to said physically operable lever at a point in a plane between said rock shaft and the pivotal connection between said levers, controlling valve mechanism connected with said levers and operable by the relative movement thereof, and means for applying physical force to the physically operable lever in a direction to separate said levers connected to the physically operable lever at a point in a plane on the opposite side of the rock shaft from said first mentioned plane, whereby the power exerted by the said actuator will be distributed between the power applying lever in a direction to apply the brakes, and said means for applying physical force, in a direction to resist the latter.

5. In a brake system for automotive vehicles, the combination with brake mechanism and a fluid pressure power actuator therefor, of a power applying lever, an oscillating rock shaft rigidly connected therewith and forming a pivotal support therefor, connections from said rock shaft to said brake mechanism, said lever extending on opposite sides of its said pivotal support, a physically operable lever having one end pivotally connected to one end of the power applying lever and its other end extending beyond said rock shaft and having a limited movement with respect to the power applying lever, a pedal lever connected with the movable end of the physically operable lever for moving it in a direction to separate said levers, a connection extending from the power actuator directly to said physically operable part between its points of connection with the power applying lever and with the pedal lever, for applying the power of the actuator to the power applying lever in a direction to apply the brakes and to the pedal lever in a direction to resist the movement thereof by the operator, stop means for limiting the relative movement of said levers in both directions, and controlling valve mechanism for the actuator carried by one of said levers and including movable parts operatively connected with the other of said levers.

6. In a brake system for automotive vehicles, the combination with brake mechanism and a fluid pressure power actuator therefor, of a power applying lever, an oscillating rock shaft rigidly connected therewith and forming a pivotal support therefor, connections from said rock shaft to said brake mechanism, said lever extending on opposite sides of its said pivotal support, a physically operable lever having one end pivotally connected to one end of the power applying lever and its other end extending beyond said rock shaft and having a limited movement with respect to the power applying lever, a pedal lever connected with the movable end of the physically operable lever for moving it in a direction to separate said levers, a connection extending from the power actuator directly to said physically operable part between its points of connection with the power applying lever and with the pedal lever, and located in a plane between said rock shaft and the point of connection between said levers, for applying the power of the actuator to the power applying lever in a direction to resist the movement thereof by the operator, stop means for limiting the relative movement of said levers in both directions, and controlling valve mechanism for the actuator carried by one of said levers and including movable parts operatively connected with the other of said levers.

7. In a brake system for automotive vehicles, the combination with brake mechanism, a power actuator having relatively movable members, and controlling valve mechanism therefor, of two pivoted levers capable of joint oscillation around a fixed pivotal axis upon which one of said levers is pivoted, said levers having a limited movement with respect to each other, said levers being connected on opposite sides of said fixed pivotal axis, respectively with the brake mechanisms and with a movable member of said actuator, connections between said valve mechanism and said levers for operating said valve by the relative movement of said levers with respect to each other, one of said levers being connected with means adapted to be engaged by a physical part of the operator for operating said valve to effect an application of the brake mechanisms by power and for operating both levers to apply physical force to the brake mechanisms whenever the limit of relative movement of said levers is reached.

8. In a brake system for automotive vehicles, the combination with brake mechanisms, a power actuator having relatively movable members, of a lever, a physically operable lever pivotally mounted with respect to the first mentioned lever and having a limited movement with respect thereto, said levers having unlimited movement around a second pivotal connection upon which one of said levers is mounted, a mechanically operable control valve mechanism connected to said lever members and rendered operable with relative movement of said lever members, said power actuator being connected to one of said levers, and to the other lever and to the brake mechanisms through the pivotal connection between said levers, and connections between said levers and said valve mechanism for operating the latter by the relative movement between said levers.

9. In a brake system for automotive vehicles, the combination with brake mechanisms, a power actuator having relatively movable members, and controlling valve mechanism therefor, of a physically operable lever, a second lever, the physically operable lever being pivotally connected with said second lever and having a limited movement with respect thereto, one of said levers being pivotally mounted upon a fixed pivotal axis, which forms a common axis around which said levers move together, connections from one of said levers on one side of said common axis to a movable member of the actuator, connections from the other of said levers on the other side of said common axis to the brake mechanisms, and connections from said levers to said valve mechanism to actuate the latter by the relative movement of said levers with respect to each other.

10. In a brake system for automotive vehicles, the combination with brakes, a power actuator having relatively movable parts, and a controlling valve therefor, of a physically operable rotatable member, a second rotatable member, the physically operable member being pivotally connected with said second member and having a limited movement with respect thereto, one of said members being pivotally mounted to rotate about a fixed pivotal axis, which forms a common axis around which said members move together, connections from one of said members on one side of said common axis to a movable part of the actuator, connections from the other of said members on the other side of said common axis to the brakes, said valve comprising relatively movable parts, one of which is connected to each of said members.

11. In a brake system for automotive vehicles, the combination with brake mechanisms, a power actuator having relatively movable members, and controlling valve mechanism therefor, of a physically operable lever, a second lever, the physically operable lever being pivotally connected with said second lever and having a limited movement with respect thereto, one of said levers being pivotally mounted upon a fixed pivotal axis, which forms a common axis around which said levers move together, connections from one of said levers on one side of said common axis to a movable member of the actuator, connections from said levers on the other side of said common axis to the valve mechanism, said valve mechanism comprising relatively movable parts, one of which is connected to each of said levers.

12. In a brake system for automotive vehicles, the combination with brake mechanism and power operating means therefor, of connections between said brake mechanism and power means comprising relatively movable interconnected physically operated and power lever members, means connecting said power means with one said levers independently of the other lever and means connecting said brake mechanism with said other lever together with means comprising a valve casing carried by one lever and a valve member therein connected to the other lever and operable by the relative movement of said levers for energizing said power means to apply the brake mechanism.

13. In a brake system for automotive vehicles, the combination with brake mechanism, a power actuator having relatively movable members, and controlling valve mechanism therefor, of two pivoted levers capable of joint oscillation around a fixed pivotal axis upon which one of said levers is pivoted, a physically operable part operatively connected to one of said levers, said levers having a limited movement with respect to each other, and said levers being connected on opposite sides of said fixed pivotal axis respectively with said physically operable part and with a movable member of said actuator, and connections between said valve mechanism and said levers for operating said valve mechanism by the relative movement of the levers with respect to each other to effect an application of the brake mechanism by power and for operating both levers to apply physical force to the brake mechanism whenever the limit of relative movement of said levers is reached.

14. In a brake system for automotive vehicles, the combination with brake mechanisms, a power actuator having relatively movable members, of a lever, a physically operable lever pivotally mounted with respect to the first mentioned lever and having a limited movement with respect thereto, said levers having angular movement around a second fixed pivotal connection upon which one of said levers is mounted, a mechanically operable control valve mechanism connected to said lever members and rendered operable with relative movement of said members, said physically operable lever being arranged to be operated by a connection on one side of said fixed pivotal connection, said power actuator being connected to one of said levers on the other side of the aforementioned fixed pivotal connection, and connections between said levers and said valve mechanism for operating the latter by the relative movement between said levers.

15. In a brake system for automotive vehicles, the combination with brake mechanism, a power actuator having relatively movable members and controlling valve mechanism therefor, of a lever, physically operable means for operating said lever, a second lever, said first mentioned lever being pivotally connected with said second lever and having a limited movement with respect thereto, one of said levers being pivotally mounted upon a fixed pivotal axis which forms a common axis around which said levers move together, connections from one of said levers on one side of said common axis to a movable member of the actuator, a connection between one of said levers and the aforementioned physically operable means, said last mentioned connection being situated on the opposite side of said common axis, connections from the other of said levers to the brake mechanisms, said controlling valve mechanism being operably connected with said levers whereby with relative movement of the latter the valve mechanism is operated to energize and de-energize the power actuator.

16. In a brake system for automotive vehicles, the combination with brake mechanisms, a power actuator having relatively movable members and controlling valve mechanism therefor, of a lever, physically operable means for operating said lever, a second lever, said first mentioned lever being pivotally connected with said second lever and having a limited movement with respect thereto, one of said levers being pivotally mounted upon a fixed pivotal axis which forms a common axis around which said levers move together, connections from one of said levers on one side of said common axis to a movable member of the actuator, a connection between one of said levers and the aforementioned physically operable means, said connection being situated on the opposite side of said common axis, connections from the other of said levers to the brake mechanisms, said valve mechanism comprising relatively movable parts, one of which is connected respectively to each of said levers.

JOHN SORENSEN.